UNITED STATES PATENT OFFICE.

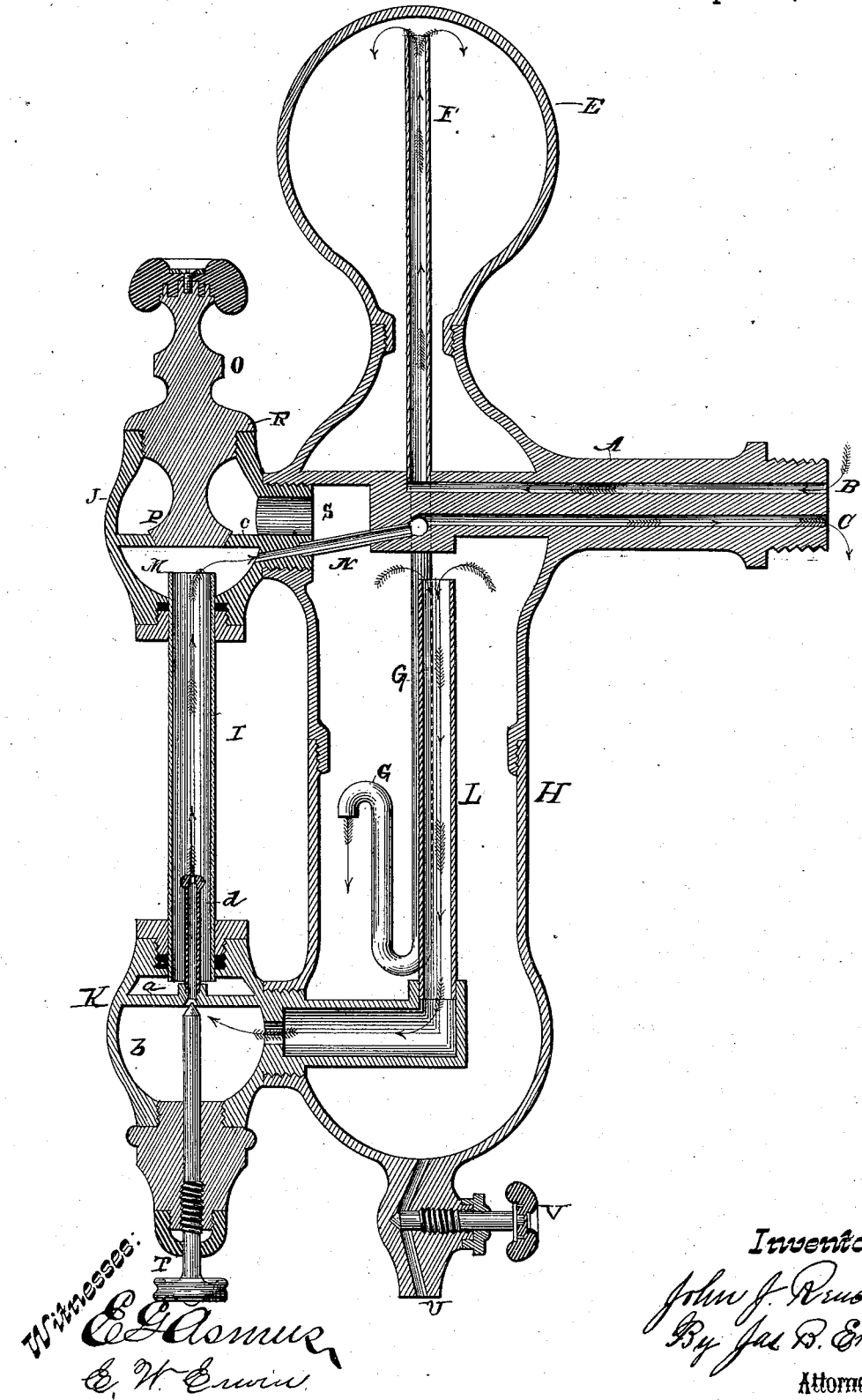

JOHN J. RENCHARD, OF DETROIT, MICHIGAN.

LUBRICATOR.

SPECIFICATION forming part of Letters Patent No. 264,477, dated September 19, 1882.

Application filed March 24, 1882. (No model.)

*To all whom it may concern:*

Be it known that I, JOHN J. RENCHARD, a citizen of the United States, residing at Detroit, in the county of Wayne and State of Michigan, have invented certain new and useful Improvements in Lubricators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in that class of lubricators for which Letters Patent of the United States No. 184,426 were granted to myself and J. V. Renchard, November 14, 1876, the operation of which lubricator was ascertained by the descent of water, drop by drop, through the oil. By my improvement the operation is ascertained by observing the ascent of the oil in like manner through the water.

The construction and operation of my improved lubricator are further explained by reference to the accompanying drawing, which represents a vertical section of the same.

A is the supporting-trunk, which is provided with steam-passage B and oil-passage C.

E is the condensing-chamber.

F is a steam-tube.

G is a water-seal or siphon-tube.

H is the oil-chamber.

Steam enters the condenser through steam-passage B and tube F.

Water is conducted from the condenser to and discharged in the oil-chamber H through the siphon-tube G. The siphon-tube G forms a water-trap, which prevents oil passing into the condenser.

The parts thus described are substantially like those shown in our said patent, both in construction and operation.

I is a glass indicator-tube, which is connected to the oil-receptacle at top and bottom by glass cages J and K, in the ordinary manner.

In operating my device the tube I is filled with water and the receptacle H is first filled with oil, which is introduced through glass cage J. As water descends through tube G the oil is floated over the mouth of oil-tube L, when it descends through said tube and passes into glass cage K, from which it is discharged into the lower end of the indicator-tube I, when, owing to its less specific gravity, it rises gradually through the water in tube I and escapes into the lower compartment, M, of the glass cage J, from which it is forced out through passages N and C into the steam-pipes of the engine. The glass cage J is closed by a double stopper, O, the lower end, P, of which closes the entrance in diaphragm c to chamber M, and the central part, R, closes the mouth of the glass cage. Thus when the stopper O is in place the passage between the oil-chamber and the indicator-tube is closed, and the oil is therefore compelled to pass out, as described, through passage C. When desirous to fill the receptacle H with oil, stopper O being removed, the neck of an oil-filler is inserted at an angle through the top of the glass cage J and the passage S. As every drop of water which passes through the tube G displaces a drop of oil, the oil thus displaced passes, drop by drop, up through the indicator-tube I, as described, and the feed is thereby readily ascertained and may be regulated by the regulating-valve T. The glass cage K is divided into two compartments by the diaphragm a, which diaphragm prevents the water in the glass tube I from sinking beneath the oil in compartment b. The oil in compartment b is led to and discharged into the lower end of tube I by tube d, from which tube it escapes, drop by drop, and passes up through the water, as mentioned.

Having thus described my invention, what I claim as new, and desire to secure by Letters Patent, is—

1. In lubricators, the combination of condensing-chamber E, oil-reservoir H, having a supporting-trunk, A, provided with separate steam and oil passages, with glass cage J, subdivided into two compartments by diaphragm c, and provided with double stopper O, glass tube I, glass cage K, having diaphragm a, tube d, and oil-tube L, said glass cage J being provided with passage S, communicating with the oil-reservoir, and tube or passage N, communicating with the oil-passage C, all substantially as and for the purpose specified.

2. In lubricators, the glass cage J, having diaphragm c, stopper O, and passages S and N, formed in the connecting trunk or coupling of said cage, said stopper closing communication between the said passages and between the glass tube and said passage S, substantially as set forth.

3. The combination, with the condensing-chamber and oil-receptacle, of a lubricator provided with a single supporting-trunk having separate steam and oil passages and vertically-arranged water-seal and oil-tubes located therein, of the glass cages J and K, said cage K being provided with oil-duct d, communicating from said oil-tube to the side glass tube, said glass cage J being provided with diaphragm c, double stopper O, and duct N, said stopper being adapted to simultaneously close the cage, and communicating between said oil-receptacle and said glass tube, all substantially as set forth.

In testimony whereof I affix my signature in presence of two witnesses.

JOHN J. RENCHARD.

Witnesses:
HENRY C. RENCHARD,
FRANCIS J. RENCHARD.